Nov. 7, 1939.　　　W. R. TALIAFERRO　　　2,179,308
ARC BACK PROTECTION
Filed June 30, 1938　　　2 Sheets-Sheet 2

WITNESSES:
E. A. McCloskey.
R. W. Bailey

INVENTOR
William R. Taliaferro.
BY
S. A. Strickleft
ATTORNEY

Patented Nov. 7, 1939

2,179,308

UNITED STATES PATENT OFFICE 2,179,308

ARC BACK PROTECTION

William R. Taliaferro, Pittsburgh, Pa., assignor to Westinghouse Electric & Manufacturing Company, East Pittsburgh, Pa., a corporation of Pennsylvania Application June 30, 1938, Serial No. 216,705

4 Claims. (Cl. 175—363)

My invention relates to the protection of rectifier systems, and it has particular application to mercury arc rectifier systems of the polyphase or the full wave type.

An object of the invention is to interrupt instantaneously, on the occurrence of a backfire in a rectifier, the make alive circuit so as to remove the condition of excitation necessary for discharge through the rectifier.

Another object of my invention is to interrupt the particular phase branch circuit or rectifier of a bank of rectifiers in which a backfire occurs without disturbing the rest of the rectifier system.

Another object of my invention is to provide means for employing half the auxiliary equipment for operating circuit breakers that would otherwise be necessary with a polyphase or multi-rectifier system.

Other objects and advantages of the invention will be apparent from the following description and drawings, in which.

Heretofore when a backfire has occurred in one of the branch circuits of a multi-phase rectifier system, circuit interrupters have been operated to interrupt the current through the complete system. This, of course, has resulted in an interruption of the direct current load power.

It is an object of my invention, as stated above, to interrupt the current in the make-alive circuit instantaneously and thus extinguish in a half cycle backfires that require the make alive excitation to maintain their discharge. If this interruption of the make alive circuit is not sufficient to extinguish the backfire, then the current is interrupted only in the particular branch circuit in which the particular backfire occurs and to accomplish it with a very economical use of auxiliary apparatus.

Figure 1:
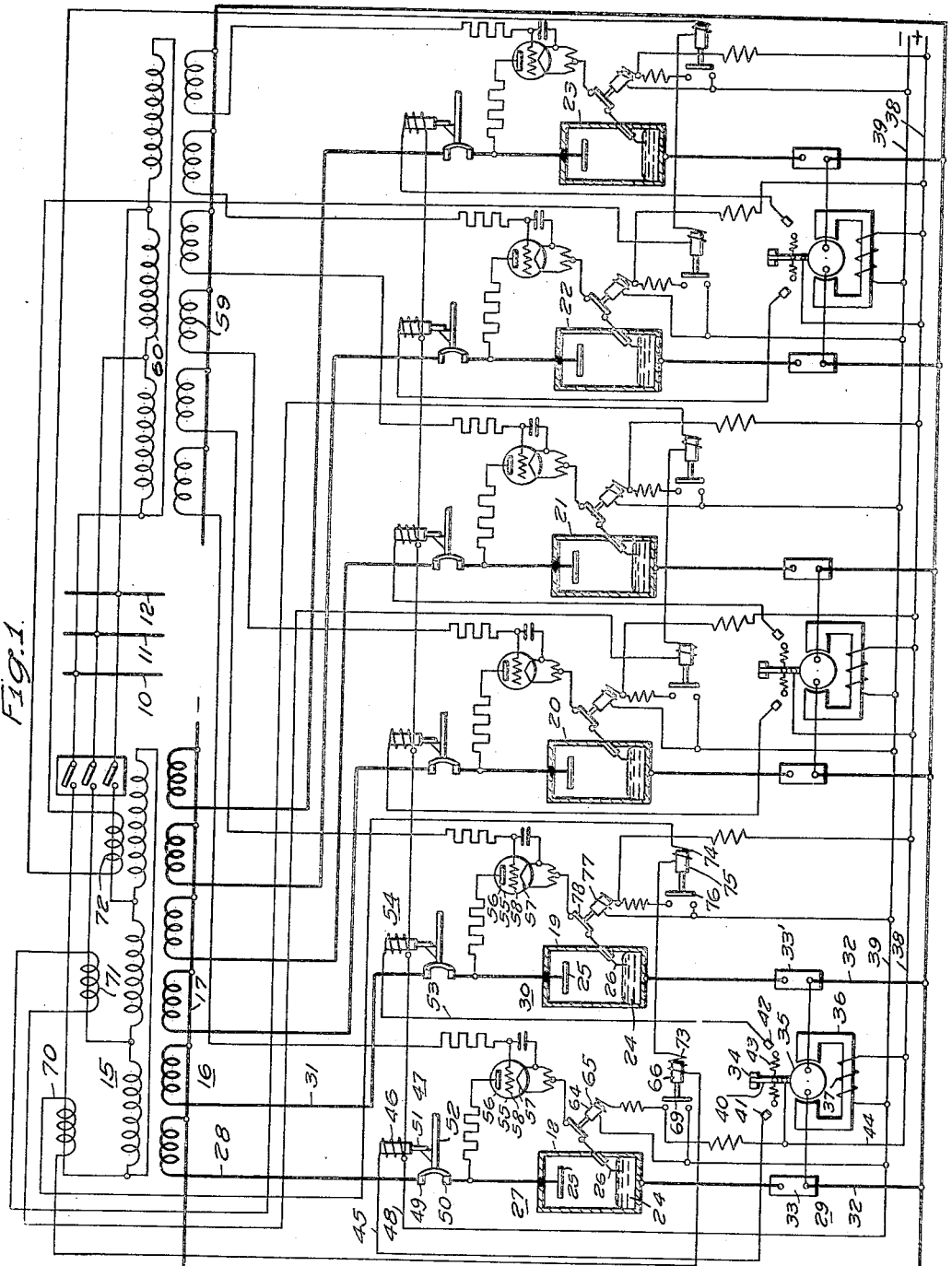
Figure 1 is a diagrammatic circuit illustrating an application of my invention to a polyphase rectifier system.

In Figure 1, I have disclosed a preferred embodiment of the invention as applied to a 6-phase system drawing electric power from a three-phase line 10, 11 and 12 and supplying direct current load power to the positive bus 13 and negative bus 14 for the load. For the power operation a delta primary 15, preferably has a 6 star secondary 16. The common lead 17 of the secondary is connected to the negative bus terminal 14. In each of the phases between the secondary 16 of the transformer and the positive bus terminal 13 are located discharge devices 18, 19, 20, 21, 22 and 23, respectively. These discharge devices are, of course, rectifiers and preferably of the type employing a mercury pool cathode 24. An anode 25 is also located within the casing which is preferably of the metal casing type with insulating lead-ins for the electrodes other than the cathode. I also prefer to utilize the type of rectifier utilizing an igniting electrode 26 of high resistance such as boron carbide partly immersed in the mercury cathode. The rectifier 18 divides the branch circuit 27 extending from the secondary of the transformer to the positive bus bar 13 into an anode connection 28 and a cathode connection 29. The rectifier 19 in the adjacent branch circuit 30 divides the circuit into anode connection 31 and cathode connection 32. Ammeter shunts 33, 33' are preferably placed in both the cathode connections 29 and 32. A relay 34, preferably having a slight delay action, is connected across these two shunts located in the cathode connections. This relay is preferably of the polarized type and the preferred embodiment disclosed consists of a coil 35 directly connected from one cathode lead or connection 29 to the other cathode lead or connection 32. This coil is located in a magnetic field preferably provided by a core 36 energized by a magnetizing coil 37 energized from any convenient source of direct current 38 and 39. The armature 40 is connected to move with the coil 35 to make contact, if actuated sufficiently, with either contact 41 or 42. Resilient means 43 maintains the armature intermediate the contacts 41 and 42 when the coil 35 is not sufficiently actuated to make these contacts. The armature 40 has a connection 44 with the positive direct current conductor 38 and the contact 41 has a connection 45 to a coil 46 actuating a circuit breaker 47, preferably in the anode connection 28 of the rectifier branch circuit 27. The coil 46 has a return lead 48 to the negative direct current conductor 39. The circuit breaker 47 may be of any standard construction having contacts 49 and 50 separated upon the release of the trigger 51 under the influence of the coil 46 and along the shaft 52 to break these contacts under the force of gravity or that of the spring. The contact 42 of the polarized relay 34 has a connection 53 to a similar circuit breaker 54 in the anode connections 31 of the branch circuit 30.

It will be noted that when normal load current flows through the two rectifier branches 27 and 30 that the drop from one of the pair of ammeter shunts 33 to the other is equal and there will be no appreciable current through the relay coil 35. The relay 34 is designed, however, not to make contact with 40 and 42 with slight variations in current between the two circuits. If, however, the rectifier 18 should backfire a very heavy current flows through the shunt 33 connected thereto and this current will cause a flow through the relay coil 35 and the armature 40 will make contact with the contact 41 and energize the coil 46 to actuate the circuit breaker 47 and interrupt the current through the branch 27. This action will, accordingly, only interrupt the phase in which the particular backfire occurs and will permit direct current to be supplied by the other phases. If on the other hand, the rectifier 19 backfires, the armature 40 of the relay 34 will make contact with 42 and the circuit breaker 54 will be actuated to interrupt the circuit in that particular phase.

The relay 34 may be designed for the particular time action desired. While the relay 34 may have an instantaneous action of opening the circuit breaker at the moment a backfire occurs, yet I prefer to have it of the time delay type. It frequently happens that arc-backs can be extinguished after one cycle by removing the energization of the make alive circuit and this one cycle will not cause too much damage to the circuit. In such installations where it is especially desired not to interrupt any of the phases if possible, the relay 34 may be designed as a time delay type in order to give the arc-back time to be extinguished by means of other relays which open the igniting circuit and deenergize it momentarily.

The make alive igniting circuit comprises a grid controlled gaseous discharge device 55 having its anode 56 connected to the anode circuit 27 or 30 of the rectifier 18 or 19 for so called "anode firing" through the cathode 57 of the discharge device to the make alive 26. The grids 58 of the discharge devices are each connected to a phase of the secondary 59 of the transformer 60 energized preferably from the main supply lines 10, 11 and 12. The common lead of the secondary 59 is connected to the positive bus bar connection 13, thus completing the connection of the circuit through the cathode of the rectifiers.

Figure 2:
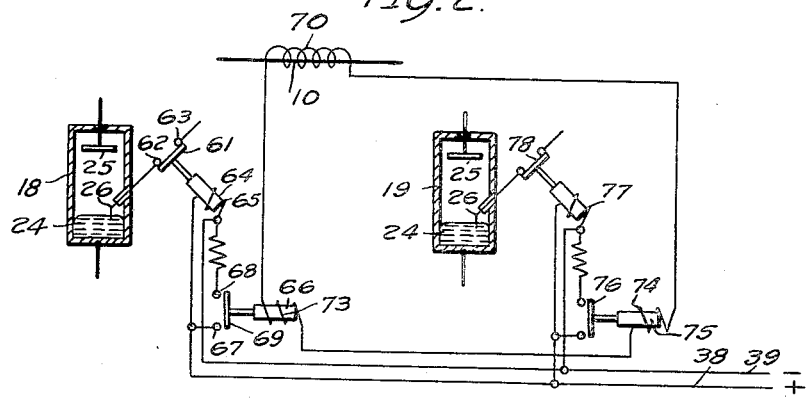
Fig. 2 is an enlarged circuit detail of the relays in the make-alive circuits of Fig. 1.

The preferred type of interrupting relay for the make alive circuit is disclosed in Fig. 1 but is also disclosed in enlarged detail in Fig. 2 apart from other circuit details for the sake of clearness. The portions of the rectifiers 18 and 19 show the mercury pool 24 with the make alive 26 immersed therein. A bar 61 with two spaced contacts 62 and 63 is located in the connection to the make alive for breaking the circuit thereto. The connecting bar 61 is preferably part of a relay 64 having the control coil 65 connected to the direct current source 38, 39 and holding the bar 61 connected. Another relay 66 has its two contacts 67, 68 and contact bar 69 in parallel with the control coil 65 of the relay 64 but in normally open position, as shown, when the make alive circuit is energized.

Three over-current relays 70, 71 and 72 are connected around the supply lines 10, 11 and 12 as shown in Fig. 1. The over-current relay 70 is connected to the control coil 73 of the relay 66 and also to the relay coil 74 of relay 75 having an open connection 76 in a branch circuit parallel with the control coil 77 keeping closed the contact bar 78 of the make alive circuit to the rectifier 19.

Upon a backfire occurring, the overload relay 70 will instantaneously energize the coil 73 and close the bar 69, making contacts 67, 68 shorting out the coil 65 and letting the bar 61 drop away from contacts 62, 63 and thus interrupting the circuit to the make alive 26. The interruption of the make alive circuit will remove the excitation between the make alive and the mercury pool and all backfires depending on this excitation for existence will be extinguished immediately at the beginning of the next half cycle that the excitation is required. When the backfire is extinguished, the overcurrent relays in the supply circuit will no longer be energized and the contact bars 69 of relay 66, for example, will drop out removing the short circuit of the coil 65 and this coil 65 will again make contact by the bar 61 with contacts 62 and 63, thus energizing the make alive circuit of make alive 26 in rectifier 18. Similar action by the relays will energize the other make alives and the multiphase group of rectifiers will automatically resume their operation.

Figure 3:
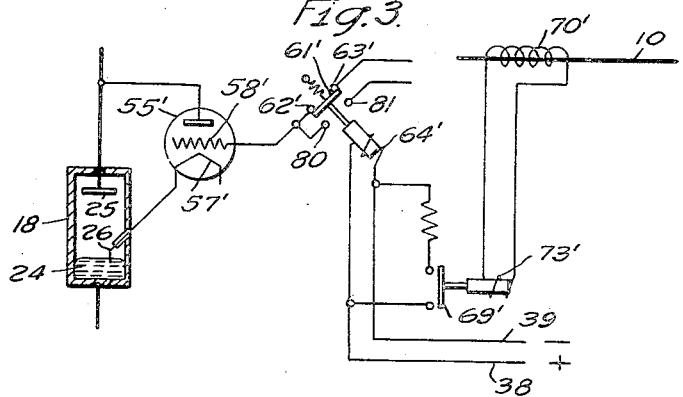
Fig. 3 is a circuit modification that might be substituted for that of Fig. 2.

In Fig. 3 is disclosed a modification of the circuit of Fig. 2. The overcurrent relay 70' operates the contact bar 69' by the coil 73' to short circuit the coil 64' and drop out the contact bar 61' similar to the action in Fig. 2, except that the contact bar 61' is in the connection to the grid 58' of the discharge device 55' instead of between the cathode 57' and the make alive 26. Also, instead of merely opening the circuit, the contact bar 61' makes contact with contact 80 connected to the grid 58' and a contact 81 connected to a source of negative bias that will block the tube 55' from energizing the make alive 26. When the overcurrent is reduced the bar 61' will again make contact with 62', 63', permitting operation of the discharge through tube 55'.

In case the instantaneous opening or blocking of the make alive circuit does not remove the backfire, then the circuit breakers 47, 54, etc., will be operated to open the rectifier circuit in the particular phase in which it occurs as explained above.

Figure 4:
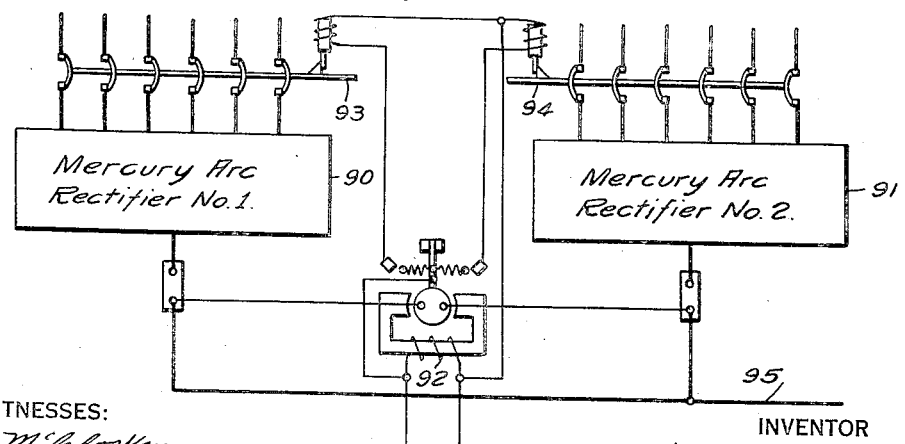
Fig. 4 is a portion of a rectifier system illustrating an application of the invention to a system employing a bank of rectifiers.

My invention is also applicable to a bank of polyphase mercury arc rectifiers as disclosed in the partial system of Fig. 4. The mercury arc rectifier 90 is in one branch circuit and the mercury arc rectifier 91 is in another adjacent branch circuit. A relay 92, preferably similar in construction to the relay 34 of Fig. 1, is connected to the circuit breaker 93 in the anode leads of the mercury arc rectifier 90 and to the circuit breaker 94 in the anode leads of the mercury arc rectifier 91. Upon a backfire occurring in mercury arc rectifier 90, for example, the circuit breaker 93 will operate to interrupt the current therethrough and the mercury arc rectifier 91 will supply the load current until the mercury arc rectifier 90 is put back into operation. The positive bus bar 95 to the load has been disclosed but the rest of the circuit may be of any variety of design of that of the prior art.

It will be noted that my invention accomplishes the result of interrupting instantaneously the make alive circuit and then only a portion of the supply circuit upon the occurrence of an undesirable backfire and accomplishes this last result by a utilization of only half the number of relays as there are branch polyphase circuits in the system.

Main circuit breaker and switch 96 is disclosed in Fig. 1 and many items such as condensers, resistances, phase-shifters, etc., are disclosed or may be added according to the circuit arrangement desired.

It is thus apparent that many modifications may be made in the form, number and arrangement of the various elements and the application of the invention. Accordingly, I desire only such limitations to be imposed upon the following claims as is necessitated by the prior art.

I claim as my invention:

1. An electrical circuit including two parallel branch circuits, a circuit breaker and a discharge device in each of said branch circuits, a shunt circuit between corresponding portions in said branch circuits, a relay in said shunt circuit, said relay being operated by a heavy differential current in one of said branch circuits to open the circuit breaker in that branch circuit only.

2. An electrical circuit including two parallel branch circuits, each branch circuit comprising a rectifier having at least one anode and cathode and anode connections and cathode connections, a circuit breaker in each of the anode connections, a relay connected between the cathode connections of the branch circuits, said relay being operated by a backfire to open the circuit breakers in the anode connections only of the rectifier in which the backfire occurs.

3. An electrical circuit including connections to a supply circuit, parallel branch circuits supplied through said connections, each branch circuit including a rectifier having an anode, a mercury pool cathode and a make alive electrode immersed in said cathode, a make alive circuit energizing said make alive electrode, means interrupting the make alive circuit upon a backfire occurring in any of the rectifiers and means then interrupting the circuit in the one only of said parallel branch circuits in which the backfire occurs.

4. An electrical circuit including connections to a supply circuit, parallel branch circuits supplied through said connections, each branch circuit including a rectifier having an anode, a mercury pool cathode and a make alive electrode immersed in said cathode, a make alive circuit energizing said make alive electrode, an over-current relay in said supply connections interrupting the make alive circuit upon a backfire occurring in the rectifier and means then interrupting the circuit in the one only of said parallel branch circuits in which the backfire occurs.

WILLIAM R. TALIAFERRO.